United States Patent
Natarajan

(10) Patent No.: US 9,286,541 B1
(45) Date of Patent: Mar. 15, 2016

(54) FAST MULTIPASS UNDERLINE REMOVAL FOR CAMERA CAPTURED OCR

(71) Applicant: Amazon Technologies, Inc., Reno, NV (US)

(72) Inventor: Pradeep Natarajan, Lexington, MA (US)

(73) Assignee: AMAZON TECHNOLOGIES, INC., Reno, NV (US)

(*) Notice: Subject to any disclaimer, the term of this patent is extended or adjusted under 35 U.S.C. 154(b) by 59 days.

(21) Appl. No.: 14/484,764

(22) Filed: Sep. 12, 2014

(51) Int. Cl.
   *G06K 9/34* (2006.01)
   *G06K 9/46* (2006.01)
   *G06K 9/00* (2006.01)
   *G06K 9/68* (2006.01)

(52) U.S. Cl.
   CPC .......... *G06K 9/4642* (2013.01); *G06K 9/00442* (2013.01); *G06K 9/6878* (2013.01)

(58) Field of Classification Search
   None
   See application file for complete search history.

(56) References Cited

U.S. PATENT DOCUMENTS

| | | | | |
|---|---|---|---|---|
| 2010/0259558 | A1* | 10/2010 | Oba | 345/619 |
| 2013/0188875 | A1* | 7/2013 | Sesum et al. | 382/198 |
| 2014/0270573 | A1* | 9/2014 | Ishizaka | 382/296 |
| 2015/0052426 | A1* | 2/2015 | Wu | 715/255 |

OTHER PUBLICATIONS

Bai, et al. Underline Detection and Removal in a Document Image Using Multiple Strategies. In Pattern Recognition, Proceedings of the 17th International Conference on (ICPR'04), vol. 2, pp. 578-581. IEEE, 2004.
Matas, et al. Robust Wide Baseline Stereo from Maximally Stable Extremal Regions. Image and Vision Computing. vol. 22, No. 10, British Machine Vision Computing 2002—Special Issue, pp. 384-393, 2004.
Nagler, et al. Hybrid Downscaling of DCT-Compressed Images. In Proceedings of IEEE Germany Student Conference (GSC) 2012.

* cited by examiner

*Primary Examiner* — Andrew Moyer
(74) *Attorney, Agent, or Firm* — Seyfarth Shaw LLP; Ilan N. Barzilay; David A. Klein

(57) ABSTRACT

A system that removes underlines in text appearing in captured images in multiple stages. The improved system rejects most text regions that do not require underline removal quickly and performs detailed underline detection and removal on a small number of regions.

21 Claims, 13 Drawing Sheets

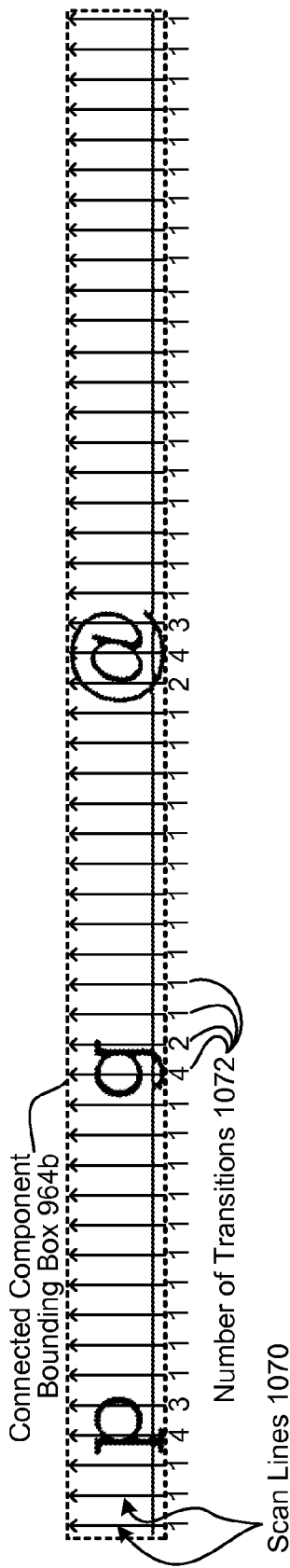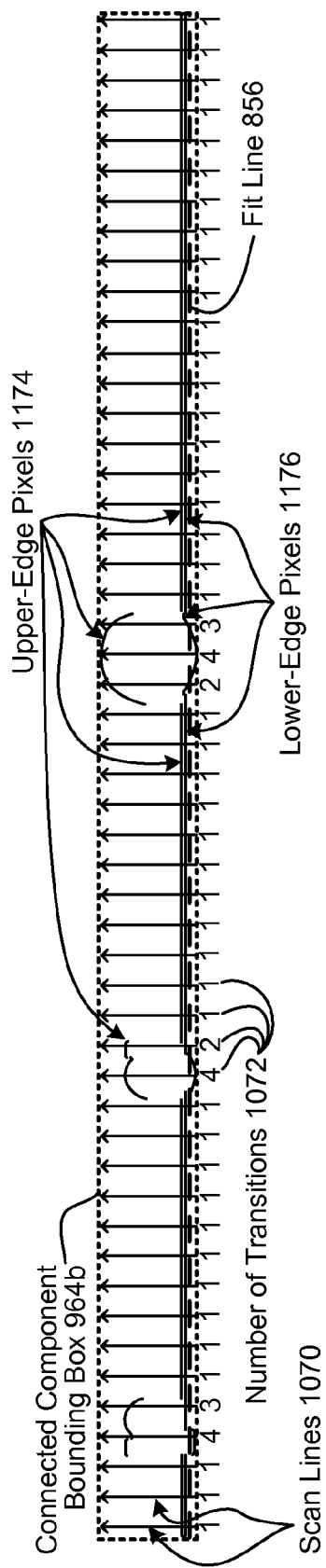

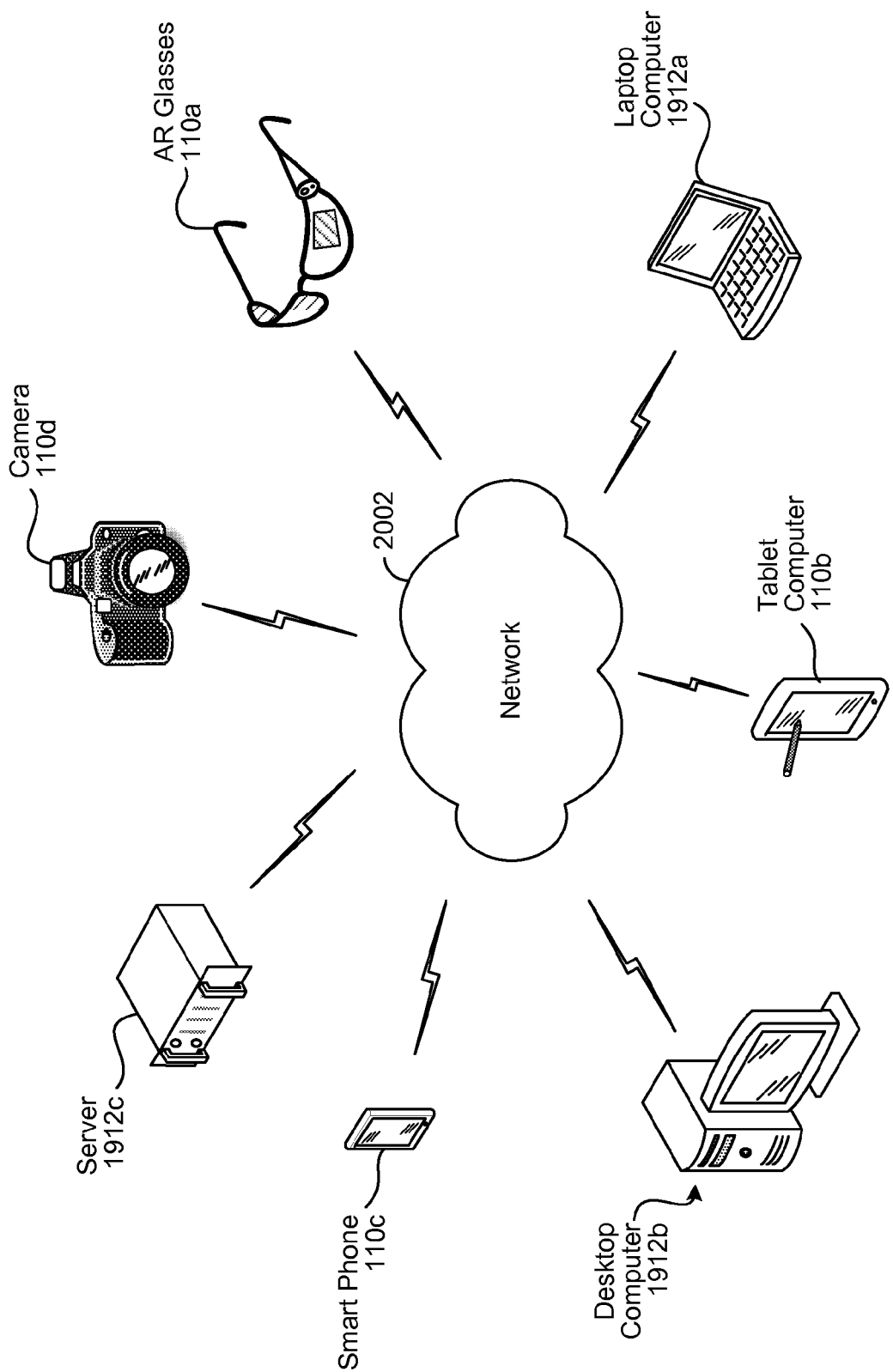

FAST MULTIPASS UNDERLINE REMOVAL FOR CAMERA CAPTURED OCR

BACKGROUND

Mobile electronic devices such as tablet computers and smart phones commonly include cameras. Software on the mobile device may process captured images to identify and recognize text and glyph symbols.

BRIEF DESCRIPTION OF DRAWINGS

For a more complete understanding of the present disclosure, reference is now made to the following description taken in conjunction with the accompanying drawings.

FIGS. 9 to 12 illustrate a series of steps to remove the underline from the second text item.

FIG. 20 illustrates an example of a computer network for use with the underline removal system.

DETAILED DESCRIPTION

Recognizing text in images captured from hand-held cameras in cellphones, tablets, and wearable computers is an extremely challenging task. Such images suffer from a variety of degradations including motion artifacts, illumination variations, orientation changes, etc. Solutions that successfully address these challenges can enable a variety of applications for end users. In particular, accurate image-to-text conversion processes able to run quickly and efficiently on mobile computing platforms and smart clients will improve processing of actionable text such as phone numbers, email addresses, and URLs (Internet uniform resource locators, also known as web addresses) found in notices, posters, billboards etc. In addition to the challenges mentioned above, such text can also have underlines that can negatively affect performance of optical character recognition (OCR) engines.

Current techniques for detecting and removing such underlines rely on analyzing each text item, identifying connected components, predicting which pixels contain underlines, and then removing the pixels predicted to contain underlines as described, for example, in "Underline Detection and Removal in a Document Image Using Multiple Strategies" by Zhen-Long Bai and Qiang Huo, in the Proceedings of the 17th International Conference on Pattern Recognition (IEEE Computer Society, ICPR 2004). Connected components include glyphs (e.g., letters) with tails or other features that touch or intersect an underline such as the lower case "p" and "g" and the "@" in the underlined text item 116 in FIG. 1. Performing these operations for each text item is computationally expensive and can significantly increase the latency, making such approaches unsuitable for execution on resource-constrained mobile computing platforms and smart clients.

Figure 1:
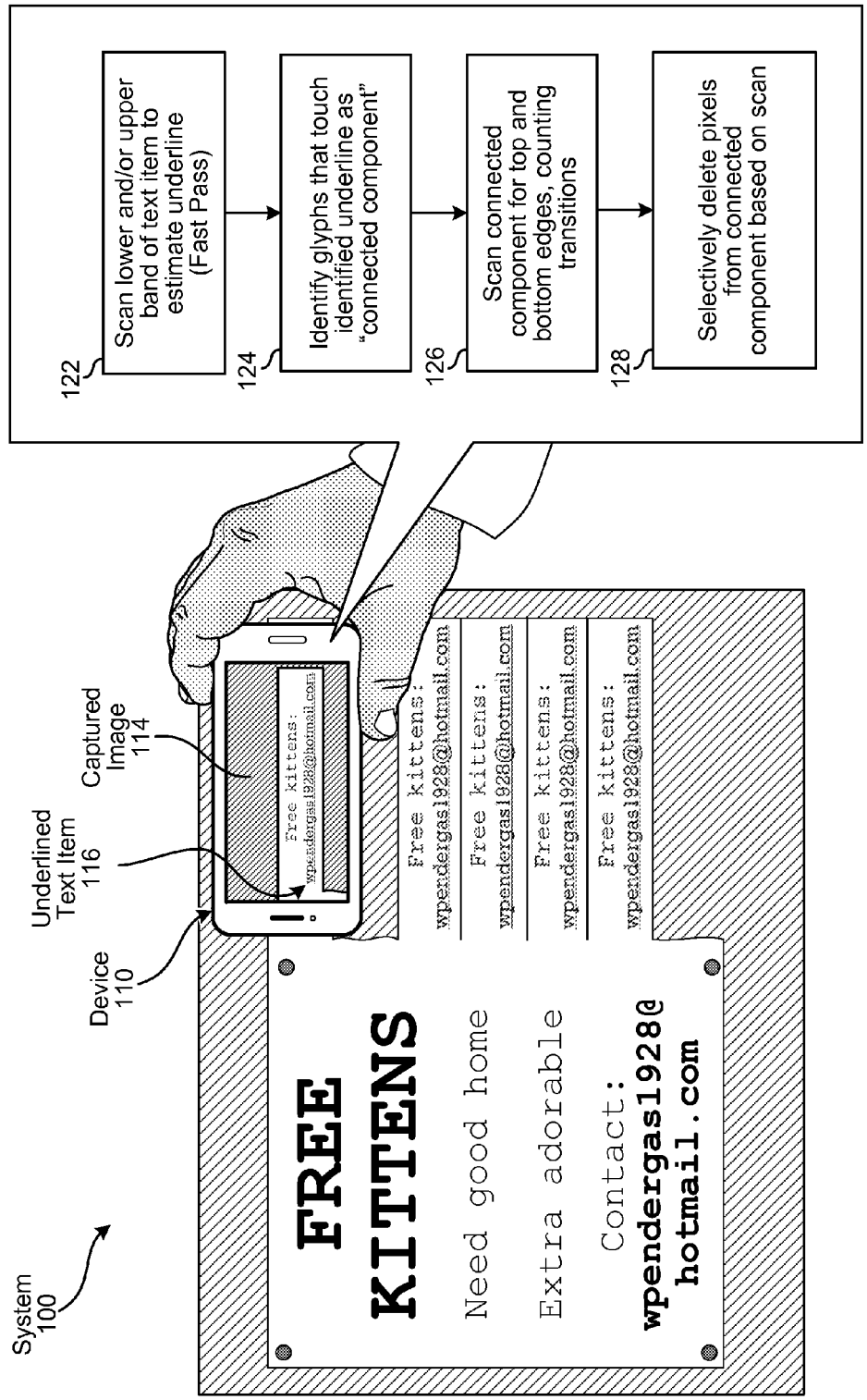
FIG. 1 illustrates a system for removing underlines from text in a captured image.

FIG. 1 illustrates an improved system 100 that removes underlines in multiple stages. The improved system rejects most text regions that do not require underline removal quickly and performs detailed underline detection and removal on a small number of regions.

A device 110 captures an image 114 that includes underlined text item 116. For each text item, a "fast pass" scan (122) is performed to determine whether the text item contains an underline. A text "item" may be a single line of text, or a portion of a single line of text. (Text "item" is used herein for text lines and text line segments to better distinguish "items" from underlines, and as discussed below, from "fit" lines and "scan" lines). The fast pass scan checks segment toward the bottom of the text item and/or toward the top of the text item. This fast pass scan can quickly eliminate text items as being unlikely to include underlines, boosting computational performance by avoiding the need to further-process every text item for underlines. The fast pass process, which will be described in more detail below, may also be used with prior-art underline removal processes to reduce the number of text items that are processed.

If a text item is identified as having an underline by the fast-pass, glyphs/letters touching the underline are identified (124) to identify connected components. Each connected component is then scanned (126) in a series of vertical stripes to determine features such as a top edge, a bottom edge, and the number of light-to-dark and/or dark-to-light transitions. Pixels comprising the underline are selectively deleted (128) based on the scan. For example, if there is only one transition in the column, the pixels from the top edge to the bottom edge can be deleted (i.e., reset to match the background color, which for a binarized image will be black or white). If there are multiple transitions in a column, the column corresponds to a glyph, in which case the pixels corresponding to the underline may be selectively deleted depending upon whether the number of transitions are below a threshold (e.g., two transitions). Reducing the threshold results in more vestigial underline remaining in the final image, but reduces the risk of deleting portions of a glyph/letter, whereas raising the threshold results in less vestigial underline remaining in the final image, but at risk of deleting portions of a glyph/letter.

Figure 2:
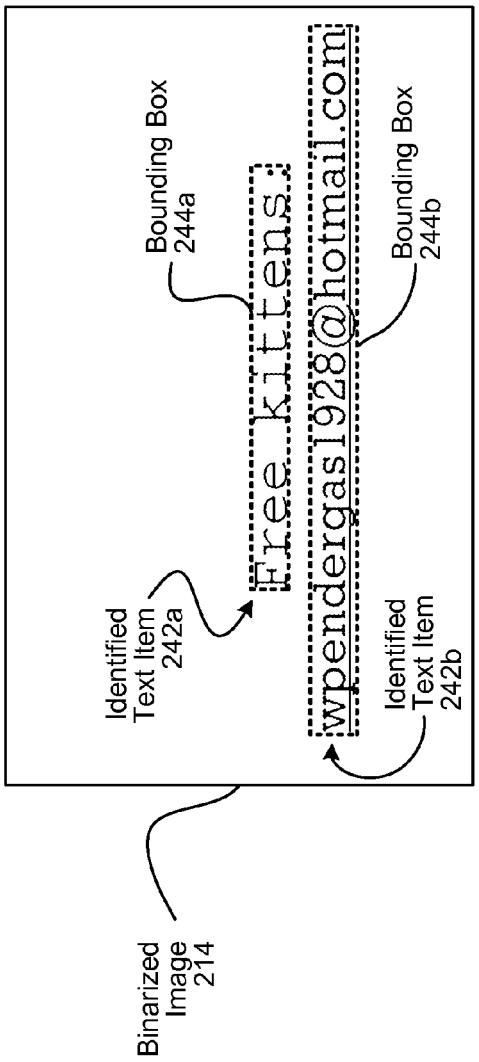
FIG. 2 illustrates a binarized version of the captured image in which text items have been identified.

FIG. 2 illustrates a binarized image 214 generated from the captured image 114. A first text item 242a is surrounded by a bounding box 244a that corresponds to the width and height of the combined glyphs in the first text item, and a second text item 242b is surrounded by a bounding box 244b that corresponds to the width and height of the combined glyphs in the second text item. How the text items are identified will be discussed further below, and identification techniques for identifying lines of text known in the art may be used.

Figure 3:
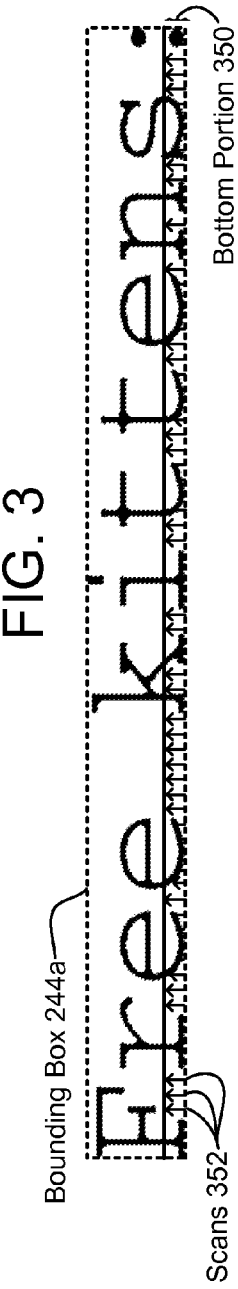
FIGS. 3 to 6 illustrate a fast-pass scan to determine whether an underline is present in a first text item.

As illustrated in FIG. 3, the fast-pass process 122 starts with the first text item 242a, vertically scanning (352) each column of pixels within a bottom portion 350 along the lower edge of the text item's bounding box 244a to determine a bottom-most pixel detected in that column (if any). A height of the bottom portion 350 that is scanned is a tunable parameter, and may be (for example) a bottom quarter of the text item.

Figure 4:
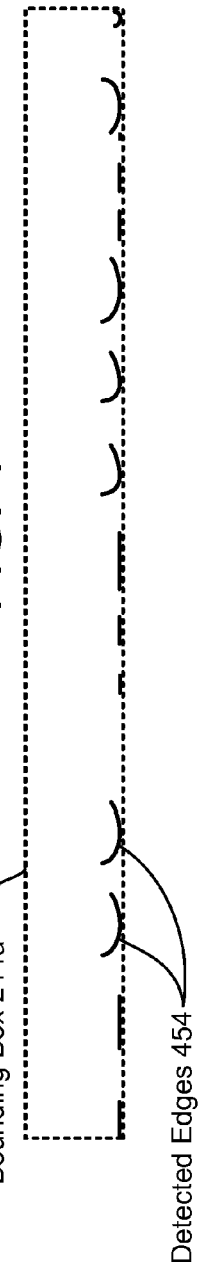

As illustrated in FIG. 4, this scan identifies a plurality of detected edges 454. A Hough transformation is applied to the detected edges 454 to determine if an underline or underlines may be present. In automated analysis of images, a frequently arising problem is detecting simple shapes such as straight lines. A Hough transform is a technique used to detect lines based on available edge data, even if the edges of the line are isolated, disjointed, and have gaps there between. Although there may be spatial deviations between an ideal line and the "noisy" edges of a line in an actual image, a Hough transform is able identify and group related edges, and determine a "best fit" line based on the group.

When applying the Hough transform, at least two thresholds may be set to differentiate whether an underline is or is not present. A first threshold parameter is a maximum gap between edges to be allowed between segments when fitting a line. A second threshold parameter is a minimum fit line length, where lines and line segments with a length below the first threshold parameter are not classified as "real" underlines. For example, a first threshold parameter may require no gap greater than two pixels, and a second threshold parameter may require a minimum fit line length of twenty pixels. Based on the settings of the first and second threshold parameters, in the case of the edges 454 scanned from the bottom of the first text item 242a in FIG. 4, no underline is detected.

Figure 5:
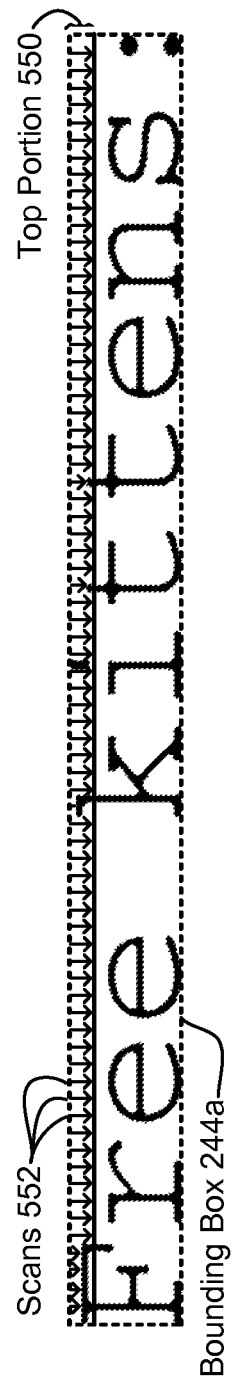

As illustrated in FIG. 5, the fast-pass process 122 also vertically scans (552) each column of pixels within a top portion 550 along the upper edge of the text item's bounding box 244a to determine a top-most pixel in that column. The height of the top portion 550 that is scanned is a tunable parameter, and may be (for example) a top quarter of the text item.

Figure 6:
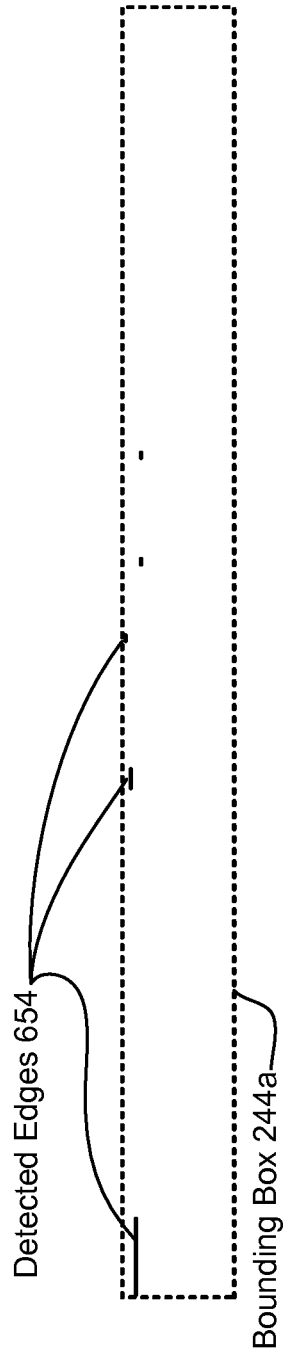

As illustrated in FIG. 6, this scan identifies a plurality of detected edges 654. A Hough transformation is applied to the detected edges 654 to determine if an underline or underlines may be present. Again, however, in the case of the edges 654 from the top of the first text item 242a, no underline is detected.

Figure 7:
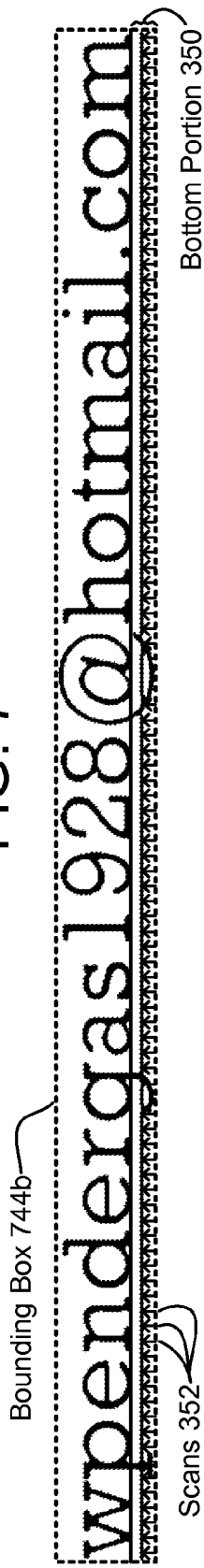
FIGS. 7 and 8 illustrate a fast-pass scan to determine whether an underline is present in a second text item.
Figure 8:
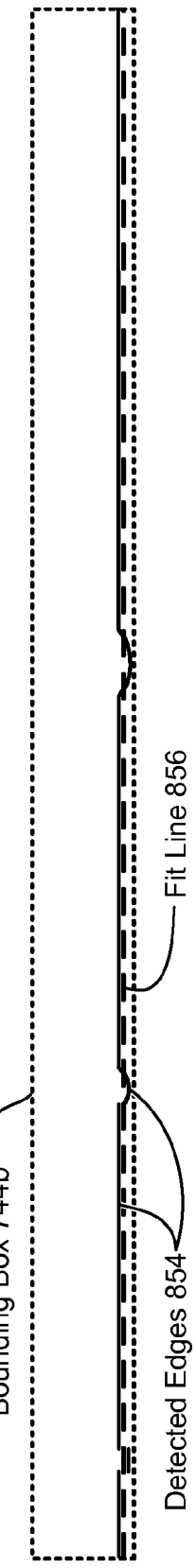

As illustrated in FIGS. 7 and 8, the fast-pass process also scans (352) the bottom portion (350) of the second text item 242b, to detect the lower edges 854 of the text item. When a Hough transform is applied to the detected edges 854, a determination is made as to whether gaps between the detected edges 854 exceed a maximum gap threshold. If a gap exceeds the maximum gap threshold, the Hough transform will group detected edges on opposite sides of the gap as separate groups. When the Hough transform determines fit lines, line fitting will be handled separately for the separate edge groups, such that a fit line will not span across the gap from one group to the other.

Also, when a fit line 856 is generated, a determination is made that the length of the fit line exceeds a minimum length threshold, such that the fit line 856 may be used as an estimate of the location of an underline in the text item. If a line fit to a group of edges does not exceed the minimum length threshold, it is disregarded.

The position of the fit line 856 as illustrated is offset from the actual underline for the purpose of illustration, and the actual position of the fit line produced by a Hough transform may have less or no offset in actual practice. As an estimated underline is identified (i.e., fit line 856), a scan of the top of the text item may optionally be skipped.

Figure 9:
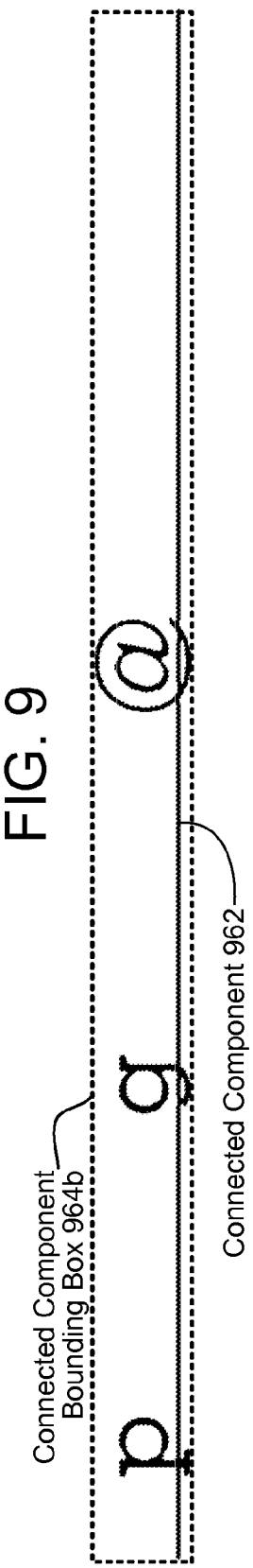

Having identified an underline in the second text item 242b, a connected component 962 is identified (124) comprising the underline and glyphs touching the underline, as illustrated in FIG. 9. In this example, the text item 242b includes a single underline and a single connected component, but a text item may include more than one of each.

The connected component 962 is identified by scanning a band above and below the estimated underline (e.g., fit line 856) to identify contiguous pixels extending from the underline out of the band. The contiguous pixels are followed to determine the connected component. A bounding box 964b corresponds to the height and width of the connected component 962.

As illustrated in FIGS. 10 and 11, having identified the connected component 962, the bounding box 964b is scanned (126) as a series of vertical stripes (scan lines 1070). For each stripe, number of transitions 1072 (e.g., light-to-dark and/or dark-to-light) are counted, and a determination is made as to the top most pixel (upper-edge pixels 1174) and bottom-most pixel (lower-edge pixels 1176). For the purpose of scanning within the bounding box, the pixels outside and abutting the top and the bottom of the bounding box 964b are presumed to be the background state (i.e., color) such that a pixel within the bounding box at the very top or very bottom with the foreground state may result in a transition at the beginning or end of the scan line 1070 by virtue of the presumed state of the abutting pixel outside of the bounding box. If the number of transitions equals one, then the transition may be assumed to be the underline and the pixels from the top (1174) to the bottom (1176) are deleted (i.e., changed to correspond to the background color).

Figure 12:
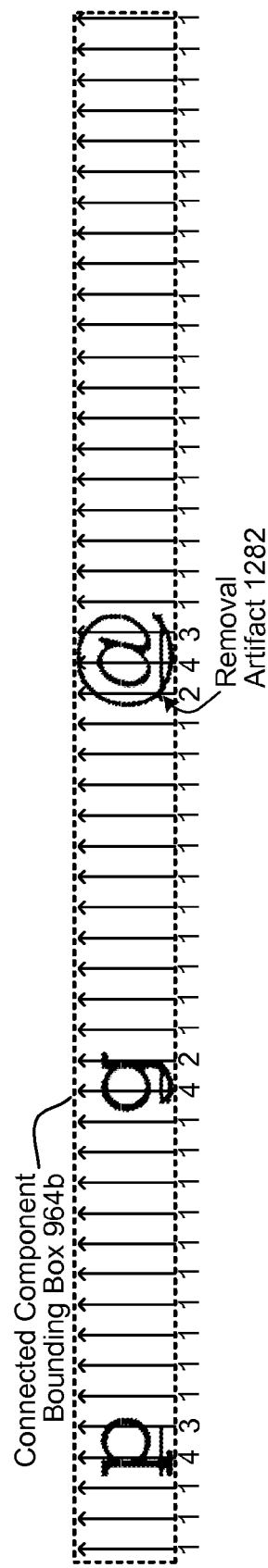
Figure 13:
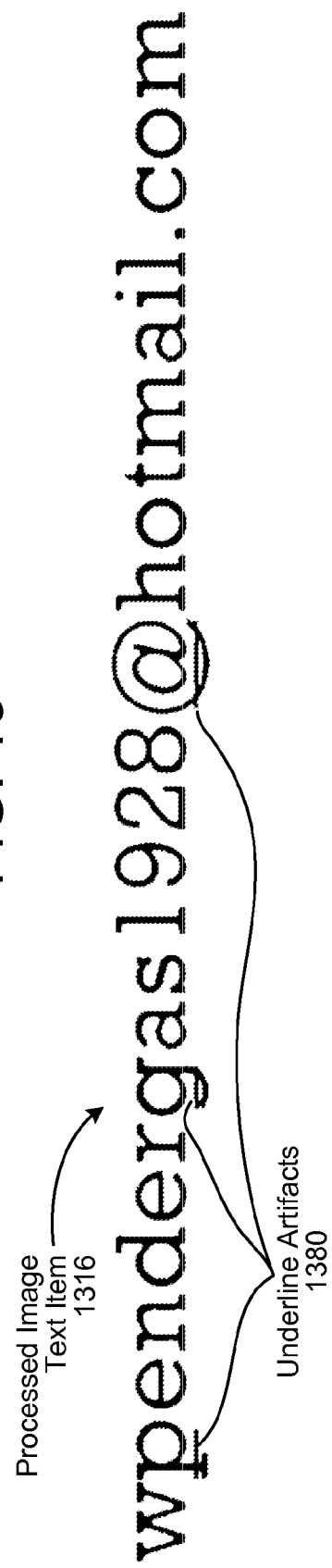
FIG. 13 illustrates the second text item after the underline-removal process.

Locations where the number of transitions 1072 are greater than one correspond to locations where the underline overlaps a glyph. The underline may be selectively deleted (128) in the glyph locations by setting a threshold number of transitions, and then deleting pixels within the band (from 124) if the top (1174) or bottom (1176) pixel in the stripe falls within the band. For example, in FIG. 12, the underline is deleted from locations where the number of transitions 1072 is two or less, and FIG. 13 illustrates the appearance of the resulting processed image text item after underline removal. Underline artifacts 1380 can be further reduced by increasing the threshold number of transitions, with the trade-off being that the larger the threshold, the greater the chance that a portion of a glyph will be deleted. Small pixel removal artifacts may also be introduced, depending upon the threshold number of transitions. For example, at the bottom of the "@" symbol where the number of transitions equals two, a small number of pixels may be removed within the band (at removal artifact 1282), where the underline overlaps the glyph.

With most conventional optical character recognition algorithms (OCR), leaving some vestigial underline artifacts 1380 results in fewer recognition errors than removing parts of the glyphs/letters, and the deletion of a small number of pixels from a glyph/letter overlapping the underline (e.g., removal artifact 1282) has little-to-no impact on recognition. The results are "good enough," producing OCR results comparable to more complicated underline removal techniques, but with a significant reduction in latency.

As illustrated in Table 1, combining the fast pass (122) with the underline deletion steps (124-128) produces 1-2% improvement in the F-score while increasing latency by ~7% in comparison to a baseline where the underline is not removed prior to OCR. An F-score is a statistical measure of a test's accuracy, and reflects accuracy including false-positive and false-negative identifications. In comparison, running the same underline deletion steps (124-128) without the fast pass produces similar performance gains with a ~17% increase in latency, checking every text item for an underline. The F-scores in Table 1 allow for up to two character spelling errors in the OCR results.

TABLE 1

|  | E-mail | Web Address | Phone Number | User Name | Do-main | Aggre-gate | Latency (ms) |
|---|---|---|---|---|---|---|---|
| Baseline | 0.808 | 0.825 | 0.856 | 0.803 | 0.816 | 0.828 | 47 |
| Single pass Underline Removal | 0.81 | 0.829 | 0.853 | 0.806 | 0.824 | 0.829 | 58 |
| Multi pass Underline Removal | 0.818 | 0.831 | 0.868 | 0.810 | 0.828 | 0.838 | 49 |

The testing for Table 1 measured the performance of using underline removal on a 1000 video datasets. A vast majority of the videos in this set do not contain text with underlines and hence will be unaffected by the underline removal process. Nonetheless, performance gains on a range of actionable text entities are reflected in the Table 1 data.

Figure 14:
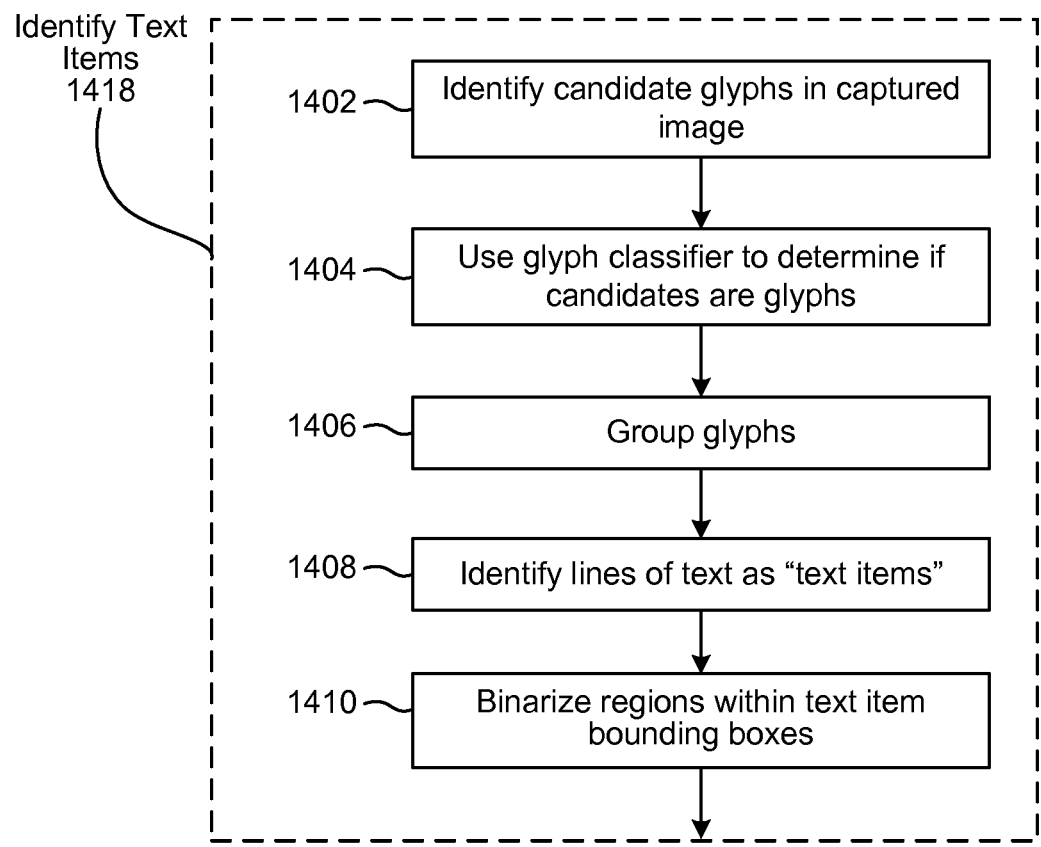
FIG. 14 illustrates example steps for processing a captured image to identify text items.

FIG. 14 illustrates a process flow for identifying (1418) text items in a captured image, getting from captured image 114 in FIG. 1 to binarized image 214 with identified text items in FIG. 2. Such processes are known in the art, but is illustrated here for explanatory purposes.

A set of candidate glyph regions are identified 1402 using a technique such as maximally stable extremal regions (MSERs) on a grayscale version of a captured image. MSERs are a method of blob detection in images. Each "blob" contains a pixel intensity pattern that the MSER algorithm determines might convey a text character or glyph (i.e., is a "candidate" region that probably includes a text character or a glyph), but further processing is required to determine whether each candidate region (i.e., each blob) comprises an actual character or glyph.

MSER candidate region detection algorithms are described by J. Matas, O. Chum, M. Urban, and T. Pajdla. in "Robust wide baseline stereo from maximally stable extremal regions," published in the Proceedings of the British Machine Vision Conference, pages 384-396, in 2002, the contents of which are incorporated herein by reference for explanation of MSER detection algorithms. Numerous refinements and improvements on MSER detection algorithms have been published since the 2002 Matas paper, and the MSER detection algorithms that may be used with the disclosed processes are not limited to the original algorithms in the 2002 paper. Other image processing algorithms may be used instead of, or in combination with, MSER detection algorithms in order to identify candidate character locations in the captured image.

MSERs are well-suited to extracting elements where an image element is warped or skewed, and are relatively unaffected by variations in image intensities. Although some MSER candidate regions may not correspond to text/glyphs, the MSER algorithm reduces overall computational overhead by identifying the regions of the image that may contain text/glyphs, since determining whether a region is a true character location is ordinarily more computationally intensive than the MSER algorithm.

A plurality of features are identified for each of the MSER regions and input 1404 into a trained classifier in order to determine whether the MSER is or is not a glyph/text character. The trained classifier applies one or more adaptive models to determine if an MSER is a glyph. The adaptive model may be stored in a database or integral to the classifier, and determines whether patterns identified when the system was trained are or are not present in the data. Examples of classifiers include Support Vector Machines (SVMs), neural networks, decision trees, AdaBoost (short for "Adaptive Boosting") combined with decision trees, and random forests. In some of these classifiers (e.g., neural networks), the models for different objects may not be discrete models, but rather, aspects of a single integrated model that can be used to identify a plurality of different objects.

For example, a support vector machines (SVM) is a supervised learning model with associated learning algorithms that analyze data and recognize patterns, such as the patterns in images, used for classification and regression analysis. Given a set of training examples, each marked as belonging to one of two categories, an SVM training algorithm builds a model that assigns new examples into one category or the other, making it a non-probabilistic binary linear classifier. An SVM model may be mapped so that the examples of the separate categories are divided by a clear gap. New examples are then mapped into that same space and predicted to belong to a category based on which side of the gap they fall on.

The order of the remaining steps to identify (1418) text items varies depending upon the particular processing pipeline. As illustrated, positively-identified glyphs are grouped (1406) (e.g., grouping adjacent letters into words), and text items in the image are identified (1408). Text items may be identified using text-line identification techniques are known in the art, and any technique may be used. The image is binarized (1410). Binarization may, among other things, binarize content within the identified text item bounding boxes (e.g., within bounding boxes 244a and 244b), and blank areas of the image outside of the text item bounding boxes, setting those areas to be black or white (depending upon which constitutes the background color for the image).

In addition, binarization (1410) may be configured to set the foreground color to black (i.e., set the color of text to black) and the background color to white independent of how the text appeared in the original image (e.g., turning light text on a dark background into black text on a white background, as well as turning dark text on a light background into black text on a white background). "Black" and "white" are abstractions in any case, as binarization produces a two-dimensional array of 1-bit elements, and whether a "zero" constitutes "black" or "white" does not matter, so long as the process is configured to distinguish which digital state corresponds to foreground, and which digital state corresponds to background.

Figure 15:
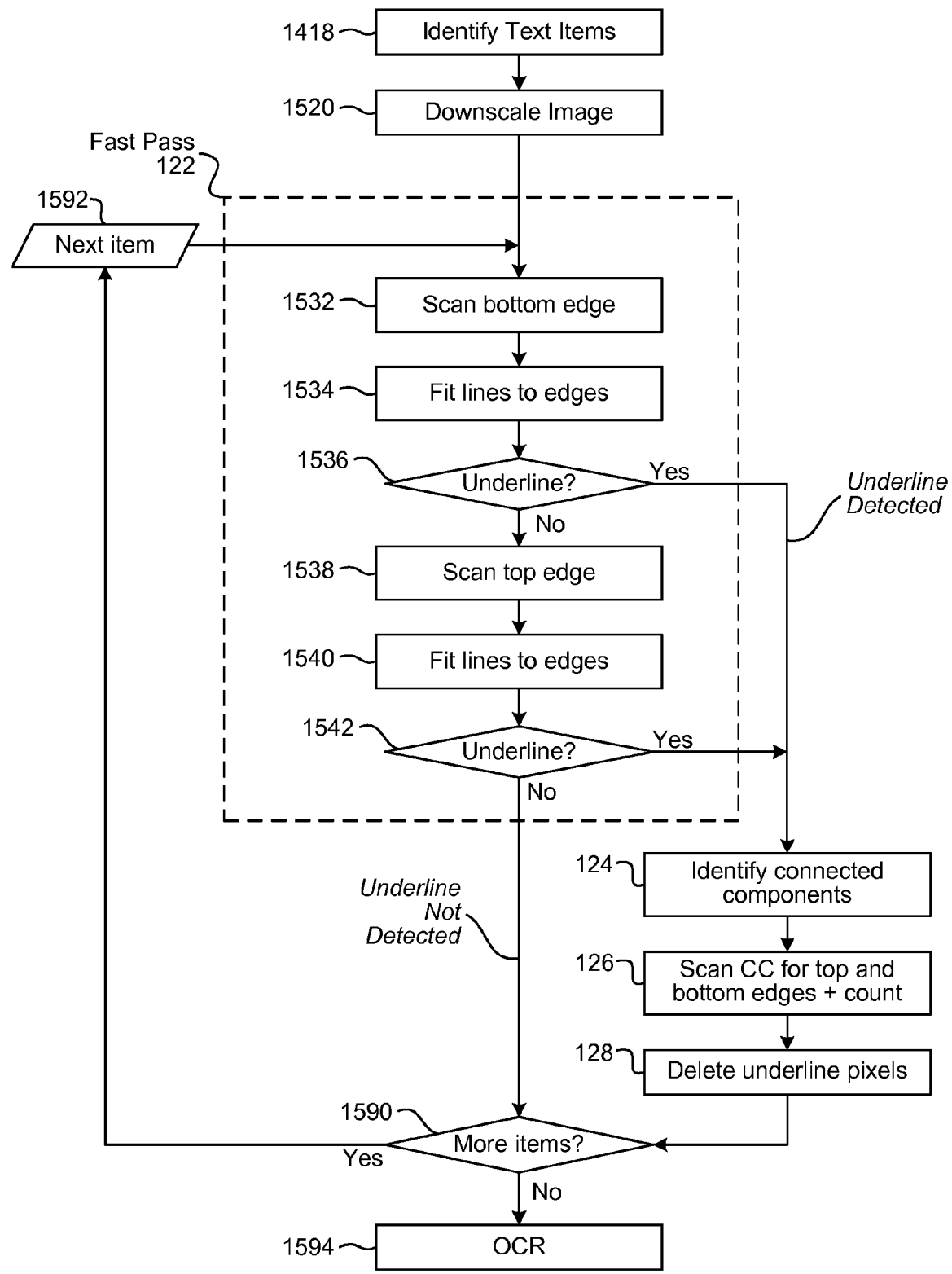
FIG. 15 illustrates example steps of the fast-pass scan process.

FIG. 15 illustrates an example process flow for the system 100 of FIG. 1, expanding upon the fast-pass underline identification process. The text items are identified (1418) as illustrated in FIG. 2. The image may then optionally be downscaled 1520 to reduce computational complexity, and downscaling may be used to collectively or individually normalize the height of text items for processing, such as making every text item forty pixels in height while maintaining the aspect ratio of the text item. Any downscaling technique may be used, such as discrete cosine transform (DCT) domain downscaling and pixel domain downscaling. The reduced resolution reduces latency, but too much reduction can result in errors. The amount of reduction is a tunable parameter and may be based in part on the height of the identified text items. An example is to reduce the resolution by a factor of four, but if there may be fine print (based on the height of the text items), less downscaling will reduce the chance of introducing errors.

The fast pass process 122 scans (1532) the bottom portion 350 of the a text item's bounding box, as illustrated for example in FIGS. 3 and 7. An example parameter or the bottom portion 350 is a bottom quarter of the text item bounding box, although another value may be chosen (e.g., between 15% and 35%). A Hough transform is applied to the detected edges to determine whether a fit line can be fit (1534) to the detected edges. FIG. 4 illustrates detected edges 454 where a fit line could not be fit, and FIG. 8 illustrates detected edges 854 where a fit line 856 could be fit.

If a fit line can be fit (1536 "Yes"), the process proceeds to identify the connected components (124), scan the connected component (126), and to delete the underline pixels (128). Otherwise (1536 "No"), the fast scan routine scans the top edge portion 550 of the text item, as illustrated for example in FIG. 5. A Hough transform is then applied to the detected edges (e.g., detected edges 654 in FIG. 6) to determine whether a fit line can be fit to the edges. If a fit line can be fit (1542 "Yes"), the process proceeds to identify the connected components (124), scan the connected component (126), and to delete the underline pixels (128).

Optionally, the image may be vertically flipped prior to underline-removal processing, if underline-removal processing is optimized for removing underlines below or above glyphs comprising the text item. Also, the top and bottom edges may be checked by the fast pass process for underlines at substantially the same time instead of sequentially. Also, even if an underline is found above or below the text, the other side may still be checked.

If no fit line can be fit during the fast-past process 122, a determination (1590) is made as to whether there are more text items in the image to be processed. If there are more text items (1590 "Yes"), the fast pass process repeats (1592 "next item") for the next text item. Otherwise (1590 "No"), when no text items remain to be processed, OCR (1594) may be performed on the processed image.

Figure 16:
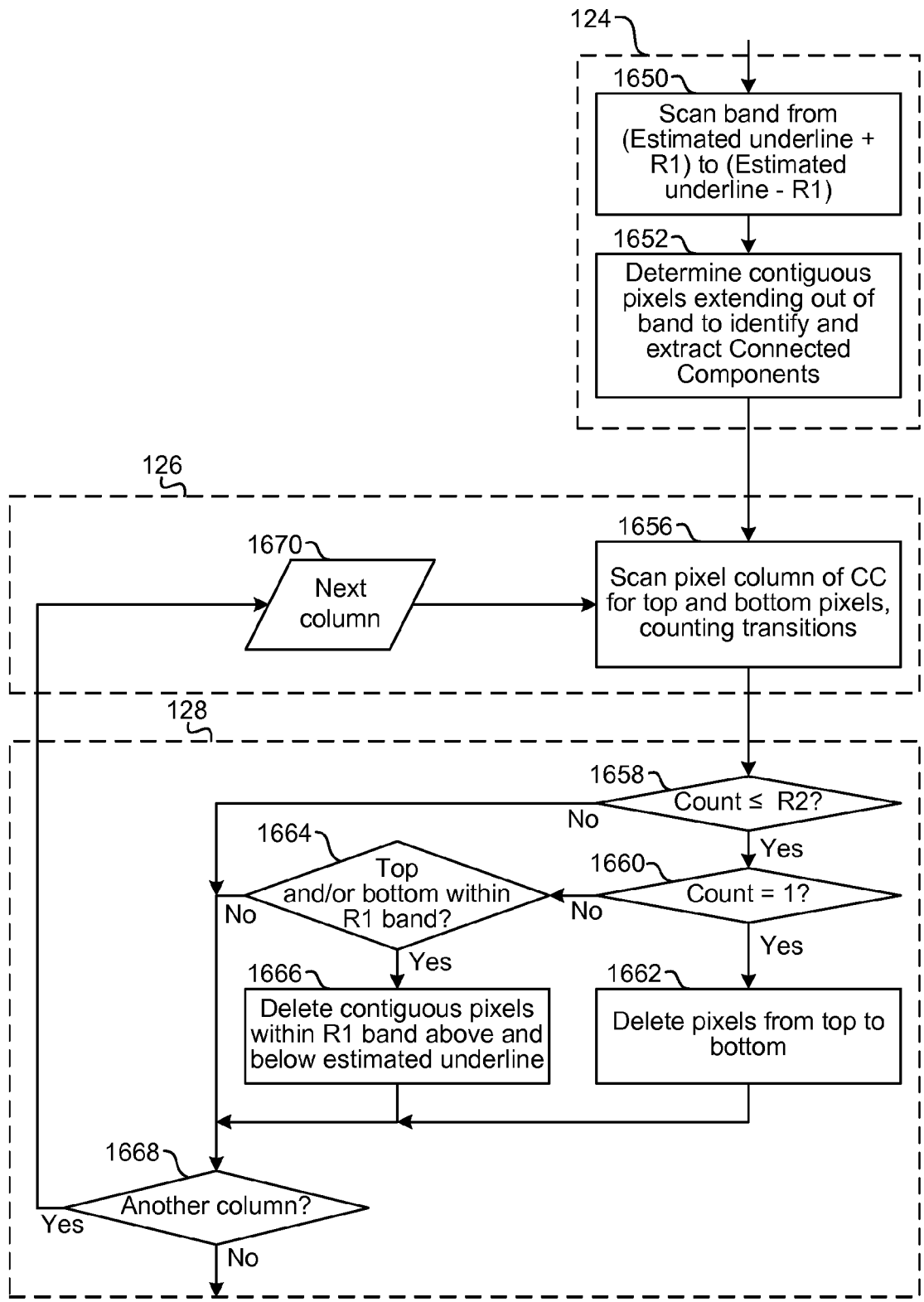
FIG. 16 illustrates example steps for removing an underline.

FIG. 16 illustrates a process flow elaborating on how connected components are identified (124), scanned (126), and the underlines are deleted (128). To identify (124) the connected components, such as connected component 962 in FIG. 9, a narrow horizontal band of the text item's bounding box (e.g., 744b) is scanned above and below the estimated underline (e.g., estimated underline/fit line 856+/−R1) to determine (1652) the contiguous pixels extending out of the band from the estimated underline.

The value of the parameter R1 should be set so that +/−R1 produces a band that is wider than a normal underline, but that is set to small enough to avoid misidentifying glyph edges near the estimated underline 856 as being the actual underline. For example, R1 may be three pixels, producing a band seven pixels wide centered on the estimated line 856. The value of R1 may be set as a percentage of the text item's height (i.e., height of bounding box 744b) to obtain a similar band, particularly if the height of the text item had not been normalized during downscaling (1520). Since binarization (1410) may result in loss of pixels in the binarized underline, with some pixels of the image underline being set to the background level, and pixels being added to the binarized underlined when background pixels are incorrectly set to the foreground level, having an R1 band that is wide mitigates missing portions of the actual underline.

Scanning the connected companion (126) to determine upper-edge pixels (e.g., 1174), lower-edge pixels (e.g. 1176), and the number of transitions (e.g., 1072) in each vertical stripe. Either the whole text item can be scanned and then the underline selectively deleted, or selective deletion can be performed stripe-by-stripe during scanning. As illustrated in FIG. 16, deletion is performed after a stripe is scanned. This process may also be performed in parallel, with multiple stripes scanned and their underlines deleted at substantially the same time.

To determine whether to selectively delete the underline in a particular stripe, a determination (1658) is made as to whether the transition count (e.g., 1072) in that stripe is less than or equal to a threshold value R2. If R2 is equal to one, only the underline between the glyphs intersecting the underline will be deleted. In the example in FIGS. 12 and 13, R2 equaled two.

If the count is not less than or equal to R2 (1658 "No"), the underline is not deleted in that stripe, and the process proceeds to determine whether there is another column/stripe of pixels to scan (1668). Otherwise (1658 "Yes"), if the count equals one (1660 "Yes"), the pixels are deleted from the top edge (e.g., 1174) to the bottom edge (1176), changing the color of underline in the particular vertical stripe to the background color. If the count does not equal one (1660 "No"), and the top edge (1174) or bottom edge (1176) is within the band (1664 "Yes") where the underline is estimated to be (i.e., fit line 856+/−R1), then the contiguous pixels above and below the estimated underline 856 are selectively deleted (1666), scanning up and down from the estimated underline 856 to identify and delete pixels that are contiguous with (above and/or below) the estimated underline 856 within the +/−R1 band. The width of the +/−R1 band used during deletion (128) may be the same as that used during connected component identification (124), or may be different, such as defining the width of the +/−R1 band used during deletion (128) based on a percentage of the height of the connected component (e.g., height of bounding box 964b) instead of the height of the text item (e.g., height of bounding box 744b). Whether this determination (1664) may be based on the top edge or the bottom edge depends upon whether the estimated underline fell within the top portion 550 (thus, top edge) or the bottom portion 350 (thus, bottom edge). If the edge does not fall within the band (1664), the underline is not deleted in that stripe. The process repeats (1668 "Yes") to the next column (1670) until no stripes/columns remain (1668 "No").

To utilize the process in FIG. 16 without the fast pass 122 from FIG. 15 (e.g., the "single pass" from Table 1), the image for every identified text item (e.g., 244a, 244b) is processed to find the connected components by applying a conventional "brute force" process of identifying contiguous pixels within each text item, and using thresholds to determine whether there is the presence of an underline. When identifying the connected component in a "brute force" approach, step 1650 in FIG. 16 may be omitted, instead scanning the entire text item. A line fit (e.g., Hough transform) may be determined for the connected component to estimate an underline, and a "band" containing the approximate underline may be estimated by scanning the text item or the connected component.

Figure 17:
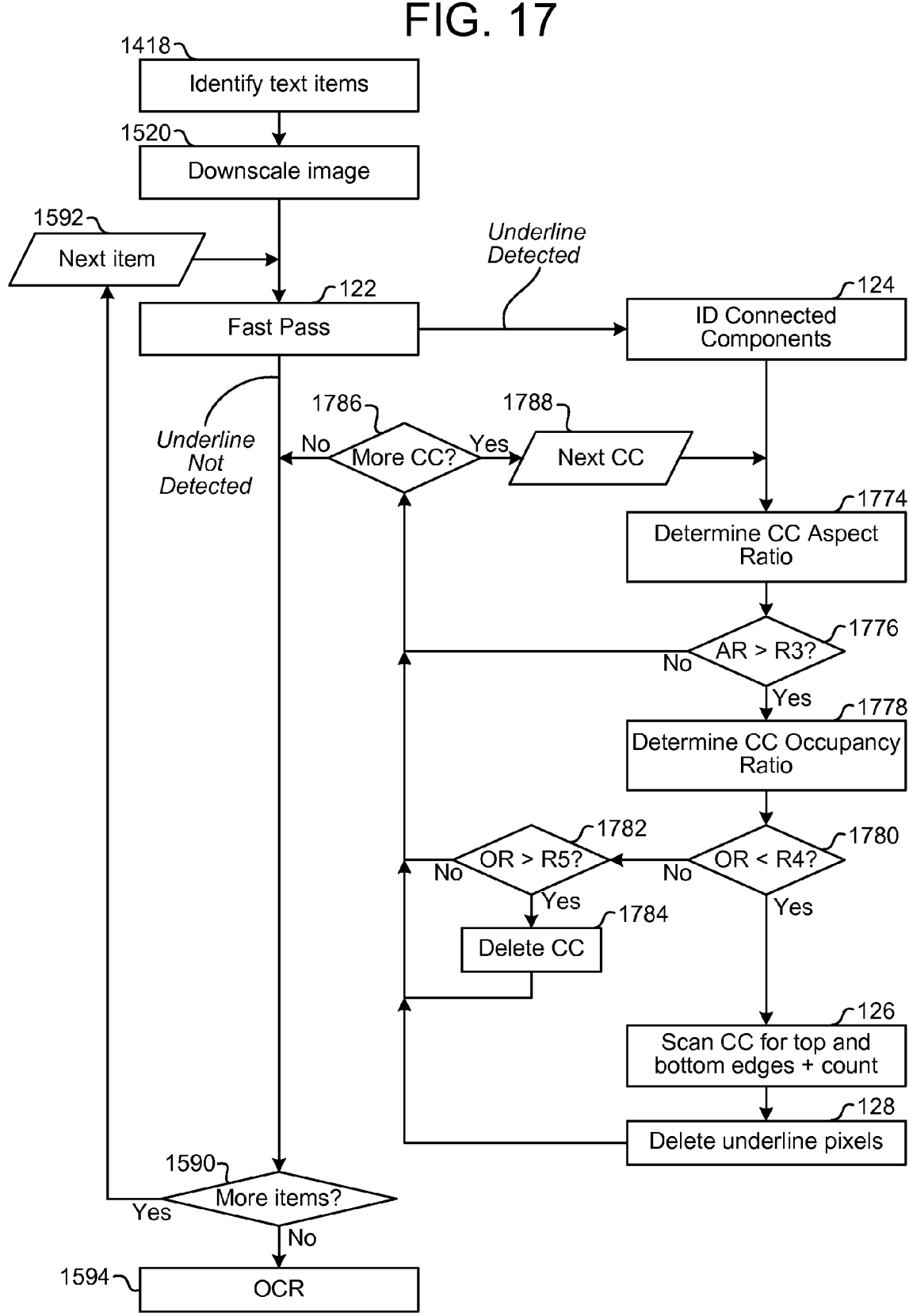
FIG. 17 illustrates additional process steps that may be used in the system of FIG. 1.

FIG. 17 illustrates additional steps that may be added to the system 100 to further expedite underline removal. After connected components are identified (124), the aspect ratio of a connected component is determined (1774), which corresponds to the width of the connected components bounding box divided by the bounding boxes' height. If the aspect ratio is not greater than a threshold value R3 (1776 "No"), then the pixels identified by the connected component identification process (124) is unlikely to be an actual connected component, such as if the aspect ratio is less than or equal to one. If the aspect ratio is one, the bounding box is a square. If the aspect ratio is less than one, the bounding box is taller than it is wide, which does not suggest a connected component comprising plural glyphs connected by an underline. If the aspect ratio is greater than one, the bounding box is wider than it is tall, which is more consistent with glyphs connected by an underline. An example value for the threshold R3 is two, such that the connected component must be at least twice as wide as it is tall.

If the aspect ratio is greater than the threshold value R3 (1776 "Yes"), the occupancy ratio is determined 1778 for the connected component. The occupancy ratio is the ratio of pixels comprising the connected component within that connected component's bounding box relative to all the pixels within bounding box. For example, in FIG. 9, the occupancy ratio would be the total area of black pixels comprising the connected component 962 divided by the area of the bounding box 964b.

A determination (1780) is made as to whether the occupancy ratio corresponds to a sparse occupancy. The occupancy ratio is compared to a threshold value R4, and if it is less than R4, occupancy is determined to be sparse. An example value for R4 is 0.2. A connected component such as that illustrated in FIG. 9 is sparse. If the occupancy ratio is sparse (1780 "Yes"), the underline is removed using the scan (126) and delete (128) process discussed above.

If the occupancy ratio is not sparse (1780 "No"), a determination (1782) is made as to whether the bounding box contains a high percentage of connected component pixels. If the occupancy ratio exceeds a threshold R5 such as 0.95, then the connected component is likely an underline without glyphs. This could occur if an underline does not touch any of the glyphs in the text item. For example, if the text item 242a in FIG. 2 were underline, the underline is unlikely to intersect any of the letters. In such a case (1782 "Yes"), the entire connected companion is deleted (1784), thereby eliminating that underline.

If there are more connected companions (1786 "Yes"), the aspect ratio and occupancy ratio determinations are made for the next connected companion (1788). Multiple connected companions may also be analyzed at substantially the same time in parallel. When there are no more connected companions to analyze (1786 "No") for a text item, a determination is made as to whether there are more text items (1590). When no text items remain (1590 "No"), OCR (1594) may be performed on the processed image with the underlines removed.

Figure 18:
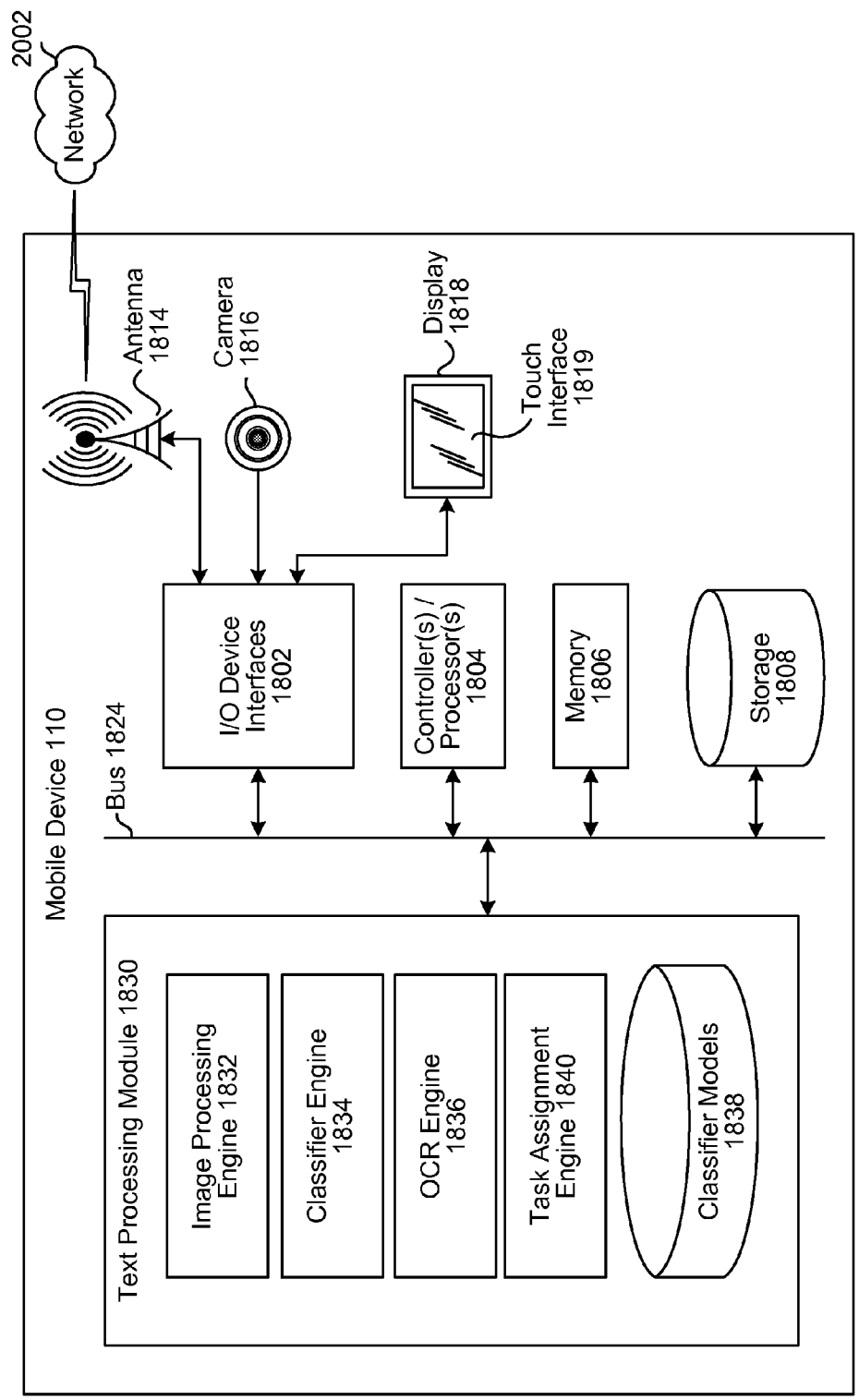
FIG. 18 is a block diagram conceptually illustrating example components of a device for capturing an image, identifying text, and removing underlines.

FIG. 18 is a block diagram conceptually illustrating example components of the device 110 of the system 100. In operation, the device 110 may include computer-readable and computer-executable instructions that reside on the device 110, or that may reside on a network-connected device operating in conjunction with device 110, as will be discussed further below.

As illustrated in FIG. 18 the device 110 may include wireless network radio connectivity (e.g., antenna 1814), one or more cameras (1816), a display 1818, and a user interface such as touch interface 1819. "Camera" includes image capture systems used to capture images, and includes (among other things), cameras used for photography and for the capture of video. Image scanners such as flat-bed optical scanners may be substituted for a camera to capture the image or images (e.g., 114).

The display 1818 may be a display of any suitable technology, such as a liquid crystal display, an organic light emitting diode display, electronic paper, an electrochromic display, or other suitable component(s). The cameras 1816, display 1818, and other components may be integrated into the device 110, or may be separate, connected to the device 110 by a wired or wireless connection.

The device 110 may include an address/data bus 1824 for conveying data among components of the device 110. Each component within the device 110 may also be directly connected to other components in addition to (or instead of) being connected to other components across the bus 1824.

The device 110 may include one or more controllers/processors 1804, that may each include a central processing unit (CPU) for processing data and computer-readable instructions, and a memory 1806 for storing data and instructions. The memory 1806 may include volatile random access memory (RAM), non-volatile read only memory (ROM), non-volatile magnetoresistive (MRAM) and/or other types of memory. The device 110 may also include a data storage component 1808, for storing data and controller/processor-executable instructions (e.g., instructions to perform the processes illustrated in, and discussed in connection with, FIGS. 1 and 14 to 17). The data storage component 1808 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1802.

Computer instructions for operating the device 110 and its various components (such as the engines 1832 to 1836 and 1840 of the text processing module 1830) may be executed by the controller(s)/processor(s) 1804, using the memory 1806 as temporary "working" storage at runtime. The computer instructions may be stored in a non-transitory manner in non-volatile memory 1806, storage 1808, or an external device. Alternatively, some or all of the executable instructions may be embedded in hardware or firmware in addition to or instead of software.

The device 110 includes input/output device interfaces 1802. A variety of components may be connected through the input/output device interfaces 1802, such as the display 1818, a speaker (not illustrated), a microphone (not illustrated), and the user interface (e.g., touch interface 1819). The input/output device interfaces 1802 may also include an interface for an external peripheral device connection such as universal serial bus (USB), Thunderbolt or other connection protocol. The input/output device interfaces 1802 may also include a connection to one or more networks 2002 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 2002, the system 100 may be distributed across a networked environment, as will be discussed further below with FIG. 20.

The device 110 further includes a text processing module 1830 that may perform the processes discussed in connection with FIGS. 1 and 14 to 17, and/or works in conjunction with another device in the system 100. For example, a first device 110 may include the camera 1816 and capture the image 114, whereas a second device 110 (or a support device 1912 such as a server) includes all or part of the text processing module 1830 that processes the captured image 114, such as performing OCR (1594).

The text processing module 1830 includes an image processing engine 1832. Among other things, the image processing engine 1832 identifies the set of candidate character regions (e.g., MSERs) (1402), aggregates the identified positive regions into group/sequences (1406), identifies text items (1408), binarizes the image (1410), downscales the image 1520, performs the fast pass (122), identifies connected components (124), scans the connected components (126), and deletes the underline (128). If any other pre-processing of the image is performed prior to classification (e.g., conversion to greyscale prior to MSER processing), that may also be performed by the image processing engine 1832.

A classifier engine 1834 of the text processing module 1830 may be used to classify (1404) candidate character locations. Among other things, the classifier engine 1834 may be a Support Vector Machine (SVM) classifier employing a Radial Basis Function (RBF) kernel. The classifier model is stored in storage 1838, which may be a section of storage 1808.

An optical character recognition (OCR) engine 1836 of the text processing module 1830 performs OCR (1594) on the processed image. Any OCR algorithm or algorithms may be used, as known in the art.

Figure 19:
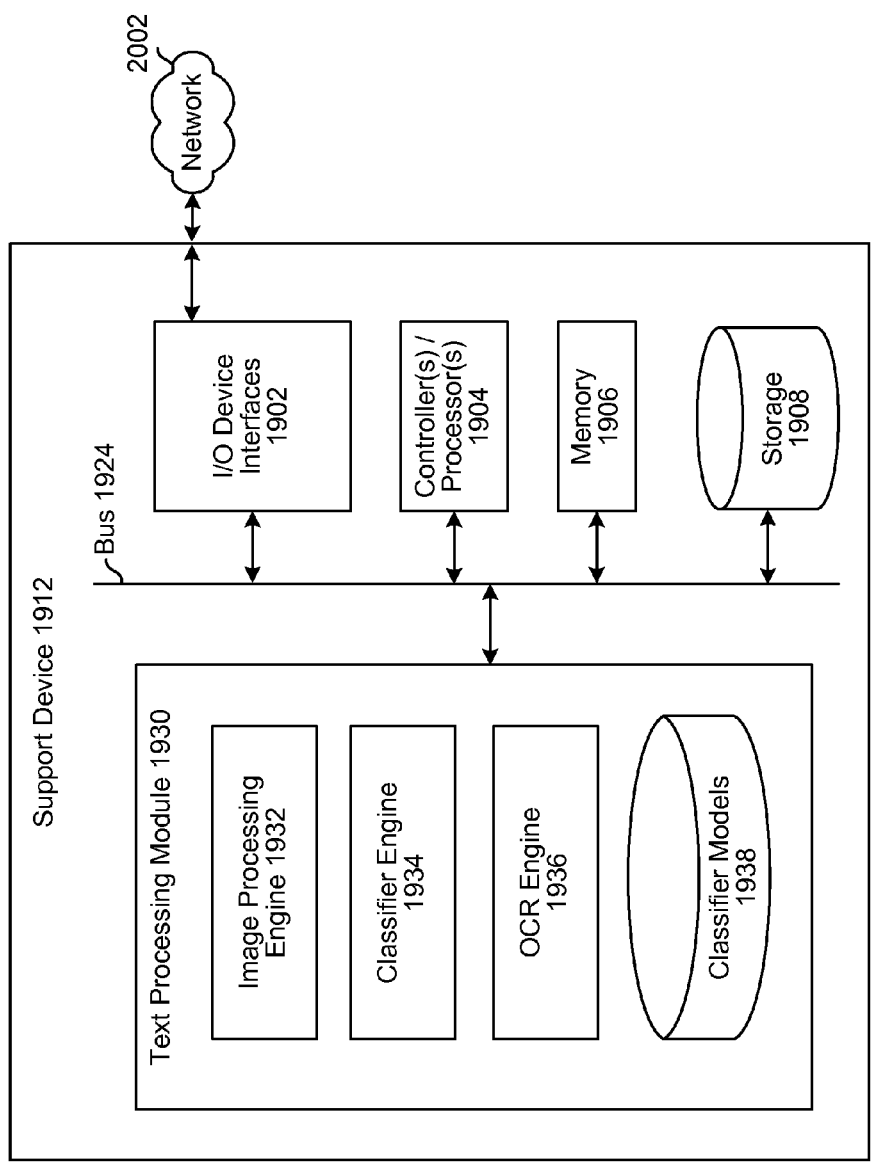
FIG. 19 is block diagram conceptually illustrating an example of components of a network-connected support device that may perform some of the underline removal and character recognition process in conjunction with the device of the system of FIG. 1.

FIG. 19 is a block diagram conceptually illustrating example components of a network-connected support device 1912 of the system 100. While some devices 110 that capture the image(s) may be able to execute their own processing pipeline, the task assignment engine 1840 of a device 110 may delegate some tasks to the support device 1912 to process the captured image (e.g., delegating OCR 1594 processing to the support device 1912). The task assignment engine 1840 may transmit the data necessary to perform pipeline step(s) (e.g., a processed binarized image), together with an instruction to perform the pipeline step(s) and return send back the results. The device 110 output the received results (e.g., via display 1818). In operation, the support device 1912 may include computer-readable and computer-executable instructions that reside on the support device 1912.

The support device 1912 may include an address/data bus 1924 for conveying data among components of the support device 1912. Each component within the support device 1912 may also be directly connected to other components in addition to (or instead of) being connected to other components across the bus 1924.

The support device 1912 may include one or more controllers/processors 1904, that may each include a central processing unit (CPU) for processing data and computer-readable instructions, and a memory 1906 for storing data and instructions. The memory 1906 may include volatile random access memory (RAM), non-volatile read only memory (ROM), non-volatile magnetoresistive (MRAM) and/or other types of memory. The support device 1912 may also include a data storage component 1908, for storing data and controller/processor-executable instructions (e.g., instructions to perform the processes illustrated in and discussed in connection with FIGS. 1 and 14 to 17). The data storage component 1908 may include one or more non-volatile storage types such as magnetic storage, optical storage, solid-state storage, etc. The support device 1912 may also be connected to removable or external non-volatile memory and/or storage (such as a removable memory card, memory key drive, networked storage, etc.) through the input/output device interfaces 1902.

Computer instructions for operating the support device 1912 and its various components (such as the engines 1932 to 1936 of the text processing module 1930) may be executed by the controller(s)/processor(s) 1904, using the memory 1906 as temporary "working" storage at runtime. The computer instructions may be stored in a non-transitory manner in non-volatile memory 1906, storage 1908, or an external device. Alternatively, some or all of the executable instructions may be embedded in hardware or firmware in addition to or instead of software.

The support device 1912 includes input/output device interfaces 1902. A variety of components may be connected through the input/output device interfaces 1902. The input/output device interfaces 1902 may also include an interface for an external peripheral device connection such as universal serial bus (USB), Thunderbolt or other connection protocol. The input/output device interfaces 1902 may also include a connection to one or more networks 2002 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 2002, the system 100 may be distributed across a networked environment, as will be discussed further below with FIG. 20.

The support device 1912 further includes a symbol recognition module 1930 that performs the processes discussed in connection with FIGS. 1 and 14 to 17, and/or works in conjunction with other devices in the system 100. For example, a mobile device 110 may include the camera(s) 1816 and capture the image to be processed, whereas the support device 1912 includes part of the text processing module 1930 that processes the captured image.

The text processing module 1930 includes an image processing engine 1932. Among other things, the image processing engine 1932 identifies the set of candidate character regions (e.g., MSERs) (1402), aggregates the identified positive regions into group/sequences (1406), identifies text items (1408), binarizes the image (1410), downscales the image 1520, performs the fast pass (122), identifies connected components (124), scans the connected components (126), and deletes the underline (128). If any other pre-processing of the image is performed prior to classification (e.g., conversion to greyscale prior to MSER processing), that may also be performed by the image processing engine 1932.

A classifier engine 1934 of the text processing module 1930 may be used to classify (1404) candidate character locations. Among other things, the classifier engine 1934 may be a Support Vector Machine (SVM) classifier employing a Radial Basis Function (RBF) kernel. The classifier model is stored in storage 1938, which may be a section of storage 1908.

An optical character recognition (OCR) engine 1936 of the text processing module 1930 performs OCR (1594) on the processed image. Any OCR algorithm or algorithms may be used, as known in the art.

How tasks are divided between the mobile device 110 and the support device 1912 may be determined dynamically by task assignment engine 1840 of the symbol recognition module 1830. The task assignment engine 1840 may determine a speed of the connection via network 2002 to the support device 1912. Based on criteria such as the speed of the network connection, the computational complexity of the process steps, and the computational capabilities of the controller(s)/processor(s) 1804, the task assignment engine 1840 may apply load balancing heuristics to dynamically divide processing steps between the other engines of the text processing module 1830 of the device 110 and the text processing module 1930 of the support device 1912.

The components of the device 110 as illustrated in FIG. 18 and the support device 1912 as illustrated in FIG. 19 are exemplary, and may be a stand-alone device or may be included, in whole or in part, as a component of a larger device or system. Although the examples of the classifier engines 1834 and 1934 described above are Support Vector Machines (SVMs), other trained classifiers may be used, such as neural networks, decision trees, AdaBoost (short for "Adaptive Boosting") combined with decision trees, and random forests.

While candidate glyph identification (1402) used by the system 100 has been described as using MSERs, other candidate region identification techniques may be used. For example, instead of MSERs (or in conjunction with MSERs), the candidate locations may be identified using histogram of oriented gradients (HoG) and Gabor features.

HoGs are feature descriptors used in computer vision and image processing for the purpose of object detection. The HoG technique counts occurrences of gradient orientation in localized portions of an image, and is similar to that of edge orientation histograms, scale-invariant feature transform descriptors, and shape contexts. However, HoG is different from these other techniques in that it is computed on a dense grid of uniformly spaced cells and uses overlapping local contrast normalization for improved accuracy. Locally-normalized HoG descriptors offer particular performance advantages relative to other existing feature sets, computed on a dense grid of uniformly spaced cells and using overlapping local contrast normalizations.

Gabor features are identified by a Gabor filter, which is a linear filter used for edge detection. Frequency and orientation representations of Gabor filters are similar to those of the human visual system, and they have been found to be particularly appropriate for texture representation and discrimination. In the spatial domain, a two-dimensional Gabor filter is a Gaussian kernel function modulated by a sinusoidal plane wave, applying image decompositions to identify and recognize objects.

The concepts disclosed herein may be applied within a number of different devices and computer systems, including, for example, image-scanning general-purpose computing systems, server-client computing systems, "smart" cellular telephone computing systems, personal digital assistants (PDAs), cameras, image scanners, tablet computers, wearable computing devices (glasses, etc.), other mobile devices, etc.

As illustrated in FIG. 20, multiple devices (110a to 110c) may contain components of the system 100 and the devices may be connected over a network 2002. Network 2002 may include a local or private network or may include a wide network such as the internet. Devices may be connected to the network 2002 through either wired or wireless connections. For example, augmented reality (AR) glasses 110a, a tablet computer 110b, a smart phone 110c, and a camera 110d may be connected to the network 2002 through a wireless service provider, over a WiFi or cellular network connection or the like. Other devices are included as network-connected support devices 1912, such as a laptop computer 1912a, a desktop computer 110b, and a server 1912c. The support devices 1912 may connect to the network 2002 through a wired connection or wireless connection. Networked mobile devices 110 may capture images using one-or-more built-in or connected camera 1816 or image capture devices, with processing performed by a text processing module 1830 of the same device or another device connected via network 2002, such as the text processing module 1930 of a support device 1912.

The above examples are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, image processing, and optical character recognition (OCR) should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of the text processing modules 1830 and 1930 may be implemented as firmware in hardware. For example, portions of the image processing engine 1832 and 1932 of the modules 1830 and 1930 may be implemented as a digital signal processor (DSP) and/or application-specific integrated circuit (ASIC).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for removing an underline from a text item before performing optical character recognition on the text item, comprising:
    acquiring an image that comprises the text item including an underline;
    identifying the text item in the acquired image;
    scanning a plurality of vertical columns across a bottom of the text item to determine one or more bottom edges;
    determining a fit line for the one or more bottom edges;
    identifying contiguous pixels extending from the fit line;
    vertically scanning the contiguous pixels in a first stripe to determine a first bottom pixel, a first top pixel, and a first number of transitions along the first stripe, the first number of transitions being a first number of light-to-dark transitions, or a first number of dark-to-light transitions;
    vertically scanning the contiguous pixels in a second stripe to determine a second bottom pixel, a second top pixel, and a second number of transitions along the second stripe, the second number of transitions being a second number of light-to-dark transitions, or a second number of dark-to-light transitions;
    determining that the first number of transitions in the first stripe is equal to one;
    determining that the second number of transitions in the second stripe is greater than one and less than or equal to a first threshold;
    deleting pixels in the image corresponding to the first stripe from the first top pixel to the first bottom pixel;
    deleting pixels in the image corresponding to the second stripe that are proximate to the fit line; and
    performing optical character recognition on the image after the pixels are deleted to recognize the text item.

2. The computer-implemented method of claim 1, further comprising:
    determining a bounding box for the contiguous pixels;
    determining an aspect ratio of the bounding box by dividing a width of the bounding box by a height of the bounding box; and
    determining that the aspect ratio is greater than a second threshold prior to vertically scanning the contiguous pixels.

3. The computer-implemented method of claim 2, further comprising:
    determining an occupancy ratio of the bounding box, the occupancy ratio being a ratio of a number of the contiguous pixels within the bounding box to a number of all pixels within the bounding box; and determining that the occupancy ratio is less than a third threshold prior to vertically scanning the contiguous pixels.

4. A computing device comprising:

at least one processor;

a memory including instructions operable to be executed by the at least one processor to perform a set of actions to configure the at least one processor to:

acquire an image that comprises a first text item including a first underline;

determine first contiguous pixels comprising the first underline and pixels extending from the first underline;

vertically scan the first contiguous pixels in a first stripe to determine a first bottom pixel, a first top pixel, and a first number of transitions along the first stripe, the first number of transitions being a first number of light-to-dark transitions, or a first number of dark-to-light transitions;

vertically scan the first contiguous pixels in a second stripe to determine a second bottom pixel, a second top pixel, and a second number of transitions along the second stripe, the second number of transitions being a second number of light-to-dark transitions, or a second number of dark-to-light transitions;

determine that the first number of transitions in the first stripe is equal to one;

determine that the second number of transitions in the second stripe is greater than one and less than or equal to a first threshold;

delete first pixels in the image from the first top pixel to the first bottom pixel for the first stripe; and delete second pixels in the image comprising the first underline for the second stripe.

5. The computing device of claim 4, wherein the instructions to determine the first contiguous pixels configure the at least one processor to:

scan, in a plurality of vertical columns, across a bottom or a top of the first text item to determine one or more edges;

determine a first fit line for the one or more edges; and identify the first contiguous pixels extending from the first fit line.

6. The computing device of claim 4, wherein the instructions further configure the at least one processor to:

perform optical character recognition (OCR) on the image after deletion of the first and second pixels.

7. The computing device of claim 4, further comprising a communications interface, wherein the instructions further configure the at least one processor to:

transmit the image after deletion of the first and second pixels to a remote device via the communications interface, the remote device to perform optical character recognition (OCR).

8. The computing device of claim 4, wherein the image further comprises a second text item, the instructions further configure the at least one processor to:

scan, in a plurality of vertical columns, across a bottom or a top of the second text item to determine one or more edges; and determine that the second text item does not include an underline based on the determined one or more edges.

9. The computing device of claim 4, wherein the image further comprises a second text item, the instructions further configure the at least one processor to:

scan, in a plurality of vertical columns, across a bottom or a top of the second text item to determine one or more edges;

determine a second fit line for the one or more edges;

identify second contiguous pixels extending from the second fit line;

determine a bounding box for the second contiguous pixels;

determine an aspect ratio of the bounding box by dividing a width of the bounding box by a height of the bounding box; and determine that the second text item does not include an underline based on the aspect ratio being less than a second threshold.

10. The computing device of claim 4, wherein the image further comprises a second text item, the instructions further configure the at least one processor to:

scan, in a plurality of vertical columns, across a bottom or a top of the second text item to determine one or more edges;

determine a second fit line for the one or more edges;

identify second contiguous pixels extending from the second fit line;

determine a bounding box for the second contiguous pixels;

determine an occupancy ratio of the bounding box, the occupancy ratio being a ratio of a number of the second contiguous pixels within the bounding box to a number of all pixels within the bounding box; and delete the second contiguous pixels from the image based on the occupancy ratio being greater than a second threshold.

11. The computing device of claim 4, wherein the image further comprises a second text item, the instructions further configure the at least one processor to:

scan, in a plurality of vertical columns, across a bottom or a top of the second text item to determine one or more edges;

determine a second fit line for the one or more edges;

identify second contiguous pixels extending from the second fit line;

determine a bounding box for the second contiguous pixels;

determine an occupancy ratio of the bounding box, the occupancy ratio being a ratio of a number of the second contiguous pixels within the bounding box to a number of all pixels within the bounding box; and determine that the second text item does not include an underline based on the occupancy ratio being between a second threshold and a third threshold.

12. The computing device of claim 4, wherein the instructions further configure the at least one processor to:

determine a bounding box for the first contiguous pixels;

determine an aspect ratio of the bounding box by dividing a width of the bounding box by a height of the bounding box; and determine that aspect ratio is greater than a second threshold prior to the vertical scan.

13. A non-transitory computer-readable storage medium storing processor-executable instructions for controlling a computing device, comprising program code to configure the computing device to:

acquire an image that comprises a first text item including a first underline;

determine first contiguous pixels comprising the first underline and pixels extending from the first underline;

vertically scan the first contiguous pixels in a first stripe to determine a first bottom pixel, a first top pixel, and a first number of transitions along the first stripe, the first number of transitions being a first number of light-to-dark transitions, or a first number of dark-to-light transitions;

vertically scan the first contiguous pixels in a second stripe to determine a second bottom pixel, a second top pixel, and a second number of transitions along the second stripe, the second number of transitions being a second number of light-to-dark transitions, or a second number of dark-to-light transitions;

determine that the first number of transitions in the first stripe is equal to one;

determine that the second number of transitions in the second stripe is greater than one and less than or equal to a first threshold;

delete first pixels in the image from the first top pixel to the first bottom pixel for the first stripe; and delete second pixels in the image comprising the first underline for the second stripe.

14. The non-transitory computer-readable storage medium of claim 13, wherein the program code to determine the first contiguous pixels further configures the computing device to:

scan, in a plurality of vertical columns, across a bottom or a top of the first text item to determine one or more edges;

determine a first fit line for the one or more edges; and identify the first contiguous pixels extending from the first fit line.

15. The non-transitory computer-readable storage medium of claim 13, wherein the program code further configures the computing device to:

perform optical character recognition (OCR) on the image after deletion of the first and second pixels.

16. The non-transitory computer-readable storage medium of claim 13, wherein the program code further configures the computing device to:

transmit the image after deletion of the first and second pixels to a remote device via a communications interface, the remote device to perform optical character recognition (OCR).

17. The non-transitory computer-readable storage medium of claim 13, wherein the image further comprises a second text item, and the program code further configures the computing device to:

scan, in a plurality of vertical columns, across a bottom or a top of the second text item to determine one or more edges; and determine that the second text item does not include an underline based on the determined one or more edges.

18. The non-transitory computer-readable storage medium of claim 13, wherein the image further comprises a second text item, and the program code further configures the computing device to:

scan, in a plurality of vertical columns, across a bottom or a top of the second text item to determine one or more edges;

determine a second fit line for the one or more edges;

identify second contiguous pixels extending from the second fit line;

determine a bounding box for the second contiguous pixels;

determine an aspect ratio of the bounding box by dividing a width of the bounding box by a height of the bounding box; and determine that the second text item does not include an underline based on the aspect ratio being less than a second threshold.

19. The non-transitory computer-readable storage medium of claim 13, wherein the image further comprises a second text item, and the program code further configures the computing device to:

scan, in a plurality of vertical columns, across a bottom or a top of the second text item to determine one or more edges;

determine a second fit line for the one or more edges;

identify second contiguous pixels extending from the second fit line;

determine a bounding box for the second contiguous pixels;

determine an occupancy ratio of the bounding box, the occupancy ratio being a ratio of a number of the second contiguous pixels within the bounding box to a number of all pixels within the bounding box; and delete the second contiguous pixels from the image based on the occupancy ratio being greater than a second threshold.

20. The non-transitory computer-readable storage medium of claim 13, wherein the image further comprises a second text item, and the program code further configures the computing device to:

scan, in a plurality of vertical columns, across a bottom or a top of the second text item to determine one or more edges;

determine a second fit line for the one or more edges;

identify second contiguous pixels extending from the second fit line;

determine a bounding box for the second contiguous pixels;

determine an occupancy ratio of the bounding box, the occupancy ratio being a ratio of a number of the second contiguous pixels within the bounding box to a number of all pixels within the bounding box; and determine that the second text item does not include an underline based on the occupancy ratio being between a second threshold and a third threshold.

21. The non-transitory computer-readable storage medium of claim 13, wherein the program code further configures the computing device to:

determine a bounding box for the first contiguous pixels;

determine an aspect ratio of the bounding box by dividing a width of the bounding box by a height the bounding box; and determine that aspect ratio is greater than a second threshold prior to the vertical scan.

* * * * *